United States Patent [19]

Musgrave

[11] 4,191,130

[45] Mar. 4, 1980

[54] CHICK PROCESSING APPARATUS

[76] Inventor: Harry J. Musgrave, P.O. Box 214, Nashville, Ark. 71852

[21] Appl. No.: 933,150

[22] Filed: Aug. 14, 1978

[51] Int. Cl.² .............................................. A01K 45/00
[52] U.S. Cl. ........................................ 119/22; 209/705
[58] Field of Search ................. 119/21, 22; 198/543, 198/803; 209/705, 914, 937; 128/173 R, 253

[56] References Cited

U.S. PATENT DOCUMENTS

| 1,712,126 | 5/1929 | Taylor | 198/543 X |
| 3,704,688 | 12/1972 | Wilson | 119/22 |
| 3,777,752 | 12/1973 | Goodwin | 128/173 R |
| 3,994,292 | 11/1976 | Goodwin | 119/22 X |

OTHER PUBLICATIONS

"Double Circle System Reduces Chick Processing Time," *Poultry Digest*, Jan., 1979, pp. 12-14.
The CHIC-MATIC Chick Processing Turntable, described in a product brochure of Arkansas International, Inc.

*Primary Examiner*—Russell R. Kinsey
*Assistant Examiner*—Robert P. Swiatek
*Attorney, Agent, or Firm*—Arnold, White & Durkee

[57] ABSTRACT

An apparatus for processing baby chicks in a hatchery comprises a turntable disposed concentrically within an annular conveyor. The center area of the turntable may be provided with a downwardly extending funnel, or provided with a funnel and an adjacent disposal system inlet feed channel. A conveyor is included for transporting chicks between the turntable and the annular conveyor.

Depending upon the particular chick processing sequence of operations, either or both the turntable and annular conveyor may be provided with a plurality of tray rings. In addition, the turntable is provided with debeaking mechanisms.

12 Claims, 4 Drawing Figures

CHICK PROCESSING APPARATUS

BACKGROUND OF THE INVENTION

The present invention relates to an apparatus for processing chicks at a hatchery, and more particularly, it relates to an apparatus for processing hatched chicks through a number of operations including sexing, debeaking, detoeing and vaccinating.

It has heretofore been common practice in chick hatcheries to collect newly hatched baby chicks from an incubator and process them through a number of operations. The chicks are first taken to a work station where each is debeaked. The chicks are next taken to a work station where they are vaccinated. Finally, they are taken to yet another work station where the chicks are sexed and placed in containers for shipping. In this conventional chick processing operation, the chicks must be handled a number of times, being repeatedly boxed for movement to a new work station, before final packaging for shipping. The numerous handlings required has made the processing of baby chicks both time consuming and expensive, as well as having the tendency to inflict injury to the chicks.

One attempt to alleviate the problems attendant to conventional chick processing operations resulted in the apparatus disclosed in U.S. Pat. No. 3,704,688. In that apparatus for processing baby chicks, the chicks are transported automatically from a first station, at which sexing is done, to a second station where debeaking and counting is done. In accordance with the '688 patent, male and female chicks are conveyed in separate channels from the first station to the second station. The apparatus disclosed comprises a supporting framework having a conveyor with segregated channels, and debeaking and counting means located adjacent the conveyor at one end.

Another apparatus developed for processing baby chicks before packaging is that disclosed in U.S. Pat. No. 3,777,752. That apparatus comprises a rotatable table having a single annular conveyer trough. Within the interior of the annular conveyor trough is a conical chute with a central opening. The chute supports a plurality of debeaking mechanisms distributed about the periphery of the chute. The chute opening overlies one end of a conveyer belt which transports the chicks to a second stationary table for counting. Along the conveyer is a chamber into which an atomized vaccine is sprayed.

Although improvements have been made in chick processing apparatus, many problems have remained in the effective utilization of hatchery floor space for the processing operation and in the reduction in handling and transporting of chicks between operations.

SUMMARY OF THE INVENTION

The instant invention provides chick hatcheries with apparatus for carrying out processing operations on baby chicks in a more efficient and economical manner than heretofore has been possible by further reducing the handling of the chicks and providing a distinct advantage in the utilization of hatchery plant floor space.

The chick processing apparatus of the present invention receives baby chicks and serves to move them through a series of operations needed to process the chicks, including sexing, debeaking, detoeing and vaccinating, before final packaging for shipping.

In general, chick processing apparatus in accordance with the present invention comprises annular conveyor means and a turntable means disposed concentrically within the annular conveyor means.

In one particular embodiment of chick processing apparatus in accordance with the present invention, the turntable has a plurality of debeaking mechanisms distributed around the turntable and a downwardly extending funnel disposed concentrically within the periphery of the turntable. A rotating annular conveyor is concentrically disposed around the turntable. A linear conveyor belt extends between the funnel outlet and the annular conveyor.

In operation of this embodiment of the invention, a conveyor supplies chicks to the inner turntable where the chicks are debeaked and placed in the funnel. The chicks pass through the funnel and are dropped onto the conveyor belt which transports the chicks to the outer annular conveyor. Workers positioned around the annular conveyor separate the chicks as to sex, vaccinate the chicks, and package them for shipping.

As a yet further feature of chick processing apparatus in accordance with the present invention, the annular conveyor is provided with a plurality of tray rings extending around the circumference of the conveyor. With an arrangement of adjacent tray rings extending around the annular conveyor, chicks transported from the turntable funnel are deposited in one of the rings, preferably the innermost tray, for one operation. After an operation has been performed in a chick it is then placed in another tray ring for another operation.

In another embodiment of chick processing apparatus in accordance with the present invention, a disposal system is provided for disposing of certain ones of the chicks supplied to the turntable. In such embodiment, the center area of the turntable includes, in addition to a funnel, a disposal system inlet feed channel. More specifically, the center area of the turntable is divided into two adjacent sections, with the funnel being set into one section and the disposal inlet being set into the other section.

The disposal system is disposed beneath the turntable surface and comprises an auger which interconnects with the inlet feed channel. A disposal outlet tube extends from the auger to a remote discharge location.

As another feature, this embodiment of the invention has a turntable which includes inner and outer tray rings that extend around the turntable, circumscribing the center area in which the funnel and disposal system inlet feed channel are set.

In utilization of this embodiment of the invention, chicks are conveyed to the inner tray ring of the turntable for sexing. The male chicks are disposed of by dropping them into the disposal system inlet feed channel. The hens are placed in the outer tray ring for debeaking, afterwhich, the chicks are dropped into the funnel to be deposited on the conveyor that will transport them to the annular conveyor. Chicks on the annular conveyor are vaccinated and packaged for shipping. Other operations such as detoeing may also be performed if so desired, in which case, the annular conveyor is desirably provided with inner and outer tray rings.

These and other aspects and features of the invention will be more fully explored in the description of preferred embodiments which follow.

BRIEF DESCRIPTION OF THE DRAWINGS

In order that the invention may be more clearly understood, it will be explained more fully with particular reference to the embodiments illustrated in the accompanying drawings wherein.

DESCRIPTION OF THE PREFERRED EMBODIMENTS

Figure 1:
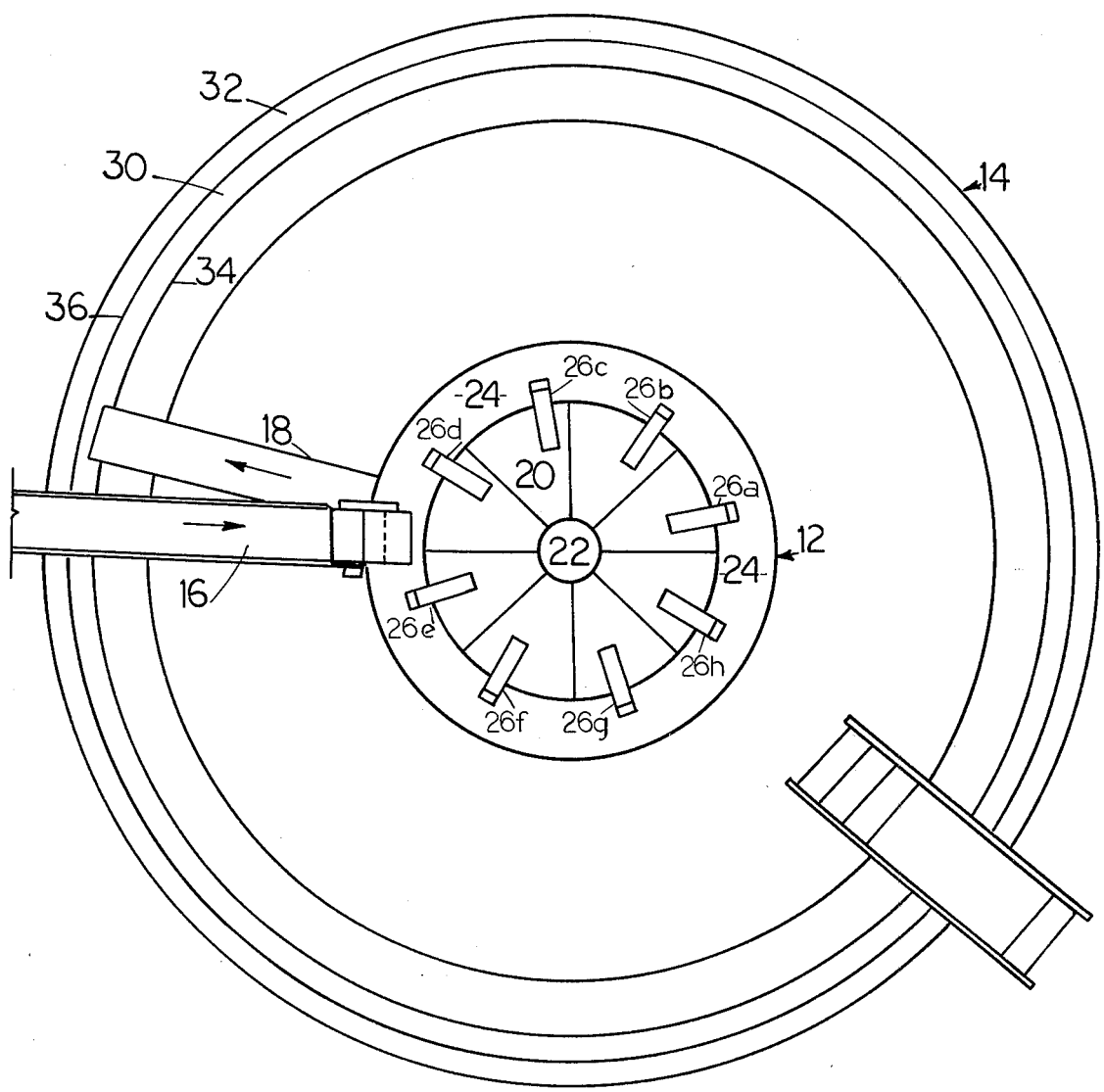
FIG. 1 is a plan view of one embodiment of chick processing apparatus utilizing a turntable disposed concentrically within an annular conveyor.
Figure 2:
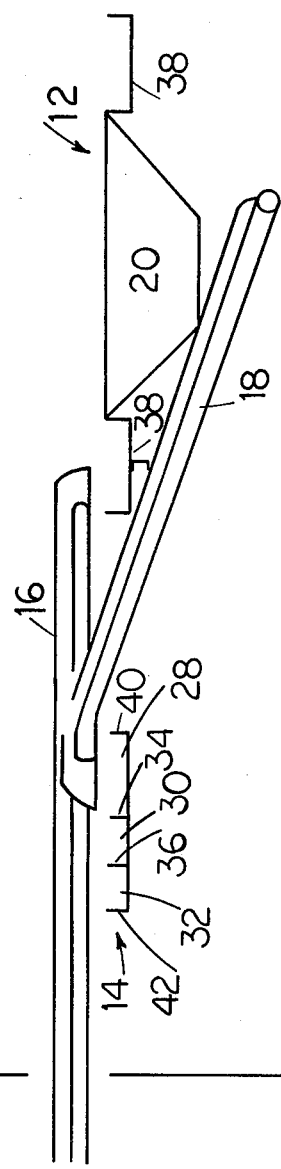
FIG. 2 is an elevation view of the chick processing apparatus shown in FIG. 1.

Referring first to FIGS. 1 and 2 of the drawings, one particular embodiment of chick processing apparatus in accordance with the present invention is shown.

In FIG. 1, a plan view of the chick processing apparatus is provided readily illustrating the utilization in the apparatus of a turntable 12 which is concentrically disposed within an annular conveyor 14. Associated equipment for the embodiment illustrated includes an infeed conveyor belt 16 which transports chicks from the washroom to turntable 12. Another conveyor belt 18 is provided for transporting chicks from turntable 12 to annular conveyor 14.

With more specific attention to turntable 12, it will be noted that this particular embodiment of the invention has a turntable design in which the center is removed and provided with a downwardly extending funnel 20. The funnel 20 has an outlet 22 disposed directly over one end of conveyor 18, as illustrated.

The portion of turntable 12 that circumscribes the center area containing funnel 20 is a rotary conveyor which moves in one direction, transporting chicks deposited thereon in a horizontal circular path. Arranged in an evenly spaced distribution around the circular path defined by turntable 12 are a plurality of debeaking mechanisms 26a–26h.

Conveyor belt 18 is of a conventional design and extends from a location beneath outlet 22 of funnel 20 to a termination point over annular conveyor 14. Chicks transported from turntable 12 by conveyor 18 are deposited on annular conveyor 14, which itself moves in one direction along a horizontal circular path.

In one embodiment shown, annular conveyor 14 is provided with an inner tray ring 28, an intermediate tray ring 30, and an outer tray ring 32. The tray rings are conveniently formed by placing circular dividers 34 and 36 extending vertically from the upper surface of annular conveyor 14, intermediate the inner and outer peripheries of annular conveyor 14.

Referring now to FIG. 2, there is shown a side view of the chick processing apparatus described in connection with FIG. 1. The apparatus is shown in a somewhat schematic or diagramatic form in FIG. 2 to demonstrate only the main functional components of the apparatus.

As will be readily apparent, turntable 12, in the embodiment shown, constitutes a circular trough 38 for receiving and holding chicks deposited thereon by means of infeed conveyor belt 16. Funnel 20 extends downwardly within the open central area of turntable 12, opening onto conveyor belt 18. Conveyor belt 18 is upwardly inclined and extends to a termination point over inner tray ring 28 into which the chicks are deposited. As is evident, outer tray rings 30 and 32 on annular conveyor 14 also are like troughs. The plurality of tray rings are formed conveniently by inner and outer walls 40 and 42 in combination with dividers 34 and 36.

In operation, the chick processing apparatus shown in FIGS. 1 and 2 is manned by work personnel who stand around the outside perimeter of turntable 12 and also around the inside and outside of the annular conveyor. Processing of chicks with the apparatus proceeds with chicks being carried by the infeed conveyor to turntable 12 and deposited in tray 38. Workers around the turntable manually pick up and debeak the chicks, after which the chicks are dropped into funnel 20 and discharged through funnel opening 22 onto conveyor 18. The chicks are transported to the inner tray ring of the annular conveyor for sexing, which involves separating the males from the females with placement of each into a respective one of the outer tray rings. The male and female chicks are then picked up, vaccinated and placed in containers for shipping.

Figure 3:
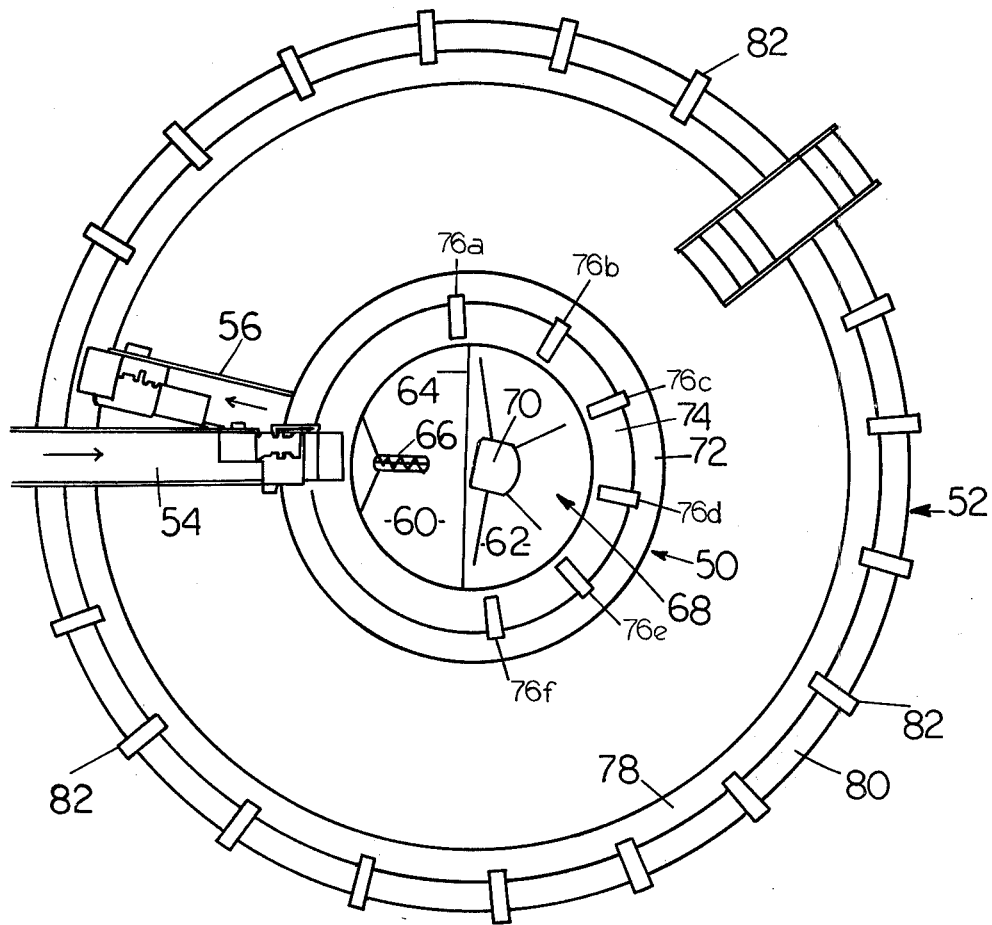
FIG. 3 is a plan view of a second embodiment of chick processing apparatus utilizing a turntable disposed concentrically within an annular conveyor, and being provided with a disposal system.
Figure 4:
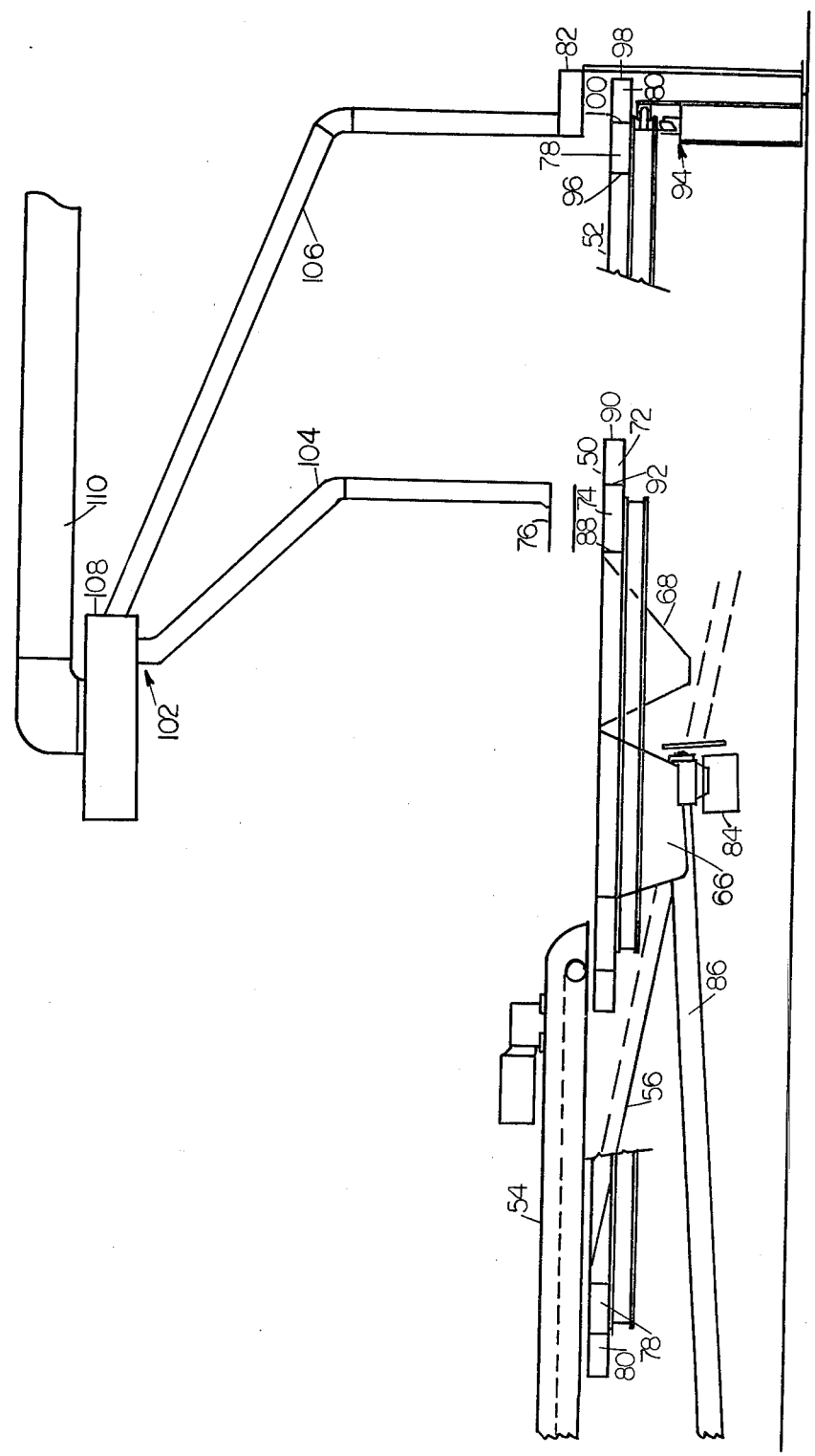
FIG. 4 is an elevation view of the chick processing apparatus shown in FIG. 3.

Referring next to FIGS. 3 and 4 of the drawings, a second embodiment of chick processing apparatus in accordance with the present invention is shown.

In FIG. 3, a plan view of the chick processing apparatus is provided readily illustrating the utilization in the apparatus of a turntable 50 concentrically disposed within an annular conveyor 52. Similar to the embodiment shown in FIGS. 1 and 2, a conveyor belt 54 is provided to transport chicks from the washroom to the turntable, with a conveyor belt 56 being provided for transporting chicks from the turntable to the annular conveyor.

With more particular attention to turntable 50, it will be noted that in this particular embodiment of the invention the center area of the turntable is provided with adjacent sections 60 and 62 separated by a divider wall 64. Within section 60 of the center area, there is provided a disposal system inlet channel 66. On the opposite side of the dividing wall, within section 62 of the center area, there is a downwardly extending funnel 68. The funnel 68 has an outlet opening 70.

The portion of turntable 50 that circumscribes the center area is a rotary conveyor which moves in one direction, transporting chicks deposited thereon in a horizontal circular path. As shown, turntable 50 has inner and outer tray rings, 72 and 74, respectively, for holding chicks. Tray rings 72 and 74 of turntable 50 are trough-like compartments defined by inner and outer vertical walls 88 and 90 in combination with a divider wall 92. Further included on turntable 50 are a plurality of debeaking mechanisms 76a–76f.

Annular conveyor 52 is provided with an inner tray ring 78 and an outer tray ring 80. Further included are a plurality of detoeing mechanisms 82.

Referring now to FIG. 4 there is an illustration presenting a plant installation of the chick processing apparatus of the second embodiment of the invention.

As is more clearly presented in the view of FIG. 4, the disposal system inlet channel 66 depends downwardly from within the center area of turntable 50. The disposal system further includes an auger mechanism 84 having an outlet discharge pipe 86 which leads away from the auger mechanism to a remote discharge location.

Downwardly extending funnel 68, as shown, overlies the lower end of inclined conveyor 56. Chicks dropped into funnel 68 are deposited on conveyor 56 and transported up to the inner tray ring 78 of annular conveyor 52.

As is further shown in FIG. 4, annular conveyor 52 is supported for horizontal rotational movement by track and guide roller mechansims like the representative structure shown and generally indicated by reference numeral 94. A plurality of such support mechanisms are utilized around the annular conveyor in a manner which is considered to be readily understood by those skilled in the art.

Similar to the tray ring arrangement of the turntable, tray rings 78 and 80 of annular conveyor 52 are trough-like compartments formed by inner wall 96, outer wall 98 and divider wall 100.

Although not forming a part of the present invention, but for purposes of complete illustration of the installation of the chick processing apparatus of the present invention, venting apparatus designated by reference numeral 102 is shown. Venting mechanism 102 innerconnects with the debeaking and detoeing mechanisms via connection tubes 104 and 106, respectively, which connect into collector head 108. A discharge outlet to 110 extends from collector head 108 to a remote discharge location.

In operation, the chick processing apparatus shown in FIGS. 3 and 4 is manned by work personnel who stand around the outside perimeter of turntable 50 and also around the inside and outside of annular conveyor 52. Processing of chicks with the apparatus proceeds with chicks being carried by the infeed conveyor to turntable 50 and deposited in inner tray ring 74. Workers around the turntable perform a sexing operation in which female chicks are placed in the outside tray ring 72 and male chicks are deposited in the disposal system inlet. The female chicks are picked up and debeaked, after which they are dropped into funnel 68. The chicks are discharged through funnel 68 onto conveyor 56 which transports them to the inner tray ring 78 of annular conveyor 52. Workers then detoe the chicks and place them in outside tray ring 80 to be vaccinated and placed in containers for shipping.

The foregoing description of the invention has been directed to particular preferred embodiments for purposes of explanation and illustration. It will be apparent, however, to those skilled in this art, that many modifications and changes in the apparatus may be made without departing from the scope and spirit of the invention. It is the applicant's intention in the following claims to cover all equivalent modifications and variations as fall within the scope of the invention.

What is claimed is:

1. In chick processing apparatus including a rotatable turntable conveyor and a conveyor for transporting chicks from the turntable, the improvement comprising:
an annular conveyor concentrically disposed around the rotatable turntable conveyor for receiving chicks transported by the conveyor from the turntable and moving the chicks along a horizontal, circular path;
said annular conveyor being provided with a plurality of adjacent trough-like tray rings.

2. Chick processing apparatus comprising in combination:
a rotatable turntable; and
an annular conveyor concentrically disposed around the rotatable turntable for moving chicks placed thereon in a horizontal circular path,
the annular conveyor having an inside diameter substantially larger than the outside diameter of the rotatable turntable to create an annular space therebetween for work personnel to occupy during conduct of chick processing operations.

3. The apparatus of claim 2 wherein:
said turntable has mounted thereon a plurality of debeaking mechanisms.

4. The apparatus of claim 2 wherein:
said turntable is provided with a downwardly extending funnel centrally disposed within the periphery of the turntable.

5. The apparatus of claim 2 wherein:
said annular conveyor means has at least two trough-like tray rings extending around the circumference thereof.

6. The apparatus of claim 2, further comprising:
conveyor means for transporting chicks from said turntable to said annular conveyor means.

7. The apparatus of claim 6, further comprising:
infeed conveyor means for supplying chicks to said turntable.

8. The apparatus of claim 2, further comprising:
a disposal system having an inlet channel disposed within the center area of said turntable.

9. Chick processing apparatus comprising in combination:
annular conveyor means for moving along a horizontal circular path;
a rotatable turntable disposed concentrically within said annular conveyor means,
said turntable being provided with a downwardly extending funnel centrally disposed within the periphery of the turntable; and
conveyor means for receiving chicks passing through the funnel and transporting the chicks to said annular conveyor means.

10. An apparatus for processing baby chicks, comprising:
annular conveyor means for moving along a horizontal circular path;
a rotatable turntable disposed concentrically within said annular conveyor means;
a plurality of stations distributed around said rotatable turntable for performing a specified operation on each chick;
conveyor means for supplying baby chicks to said rotatable turntable; and
means for transporting baby chicks from said rotatable turntable to said annular conveyor means.

11. The apparatus of claim 10 wherein:
said turntable includes a downwardly extending funnel centrally disposed within the periphery of said turntable,
the funnel having an outlet opening overlying said chick transporting means.

12. The apparatus of claim 10 further comprising:
a disposal system, the inlet for which is disposed centrally within the periphery of the turntable;
said disposal system including an auger interconnected with the inlet and a discharge conduit.

* * * * *